(12) United States Patent
Tancevski

(10) Patent No.: US 7,899,066 B2
(45) Date of Patent: Mar. 1, 2011

(54) DISTRIBUTED INTELLIGENCE MAC PROTOCOLS FOR DWDM RING NETWORKS

(75) Inventor: Ljubisa Tancevski, Dallas, TX (US)

(73) Assignee: Alcatel Lucent, Paris (FR)

( * ) Notice: Subject to any disclaimer, the term of this patent is extended or adjusted under 35 U.S.C. 154(b) by 1432 days.

(21) Appl. No.: 09/962,685

(22) Filed: Sep. 25, 2001

(65) Prior Publication Data

US 2002/0097731 A1 Jul. 25, 2002

Related U.S. Application Data

(60) Provisional application No. 60/264,113, filed on Jan. 25, 2001.

(51) Int. Cl.
*H04L 12/28* (2006.01)
*H04L 12/56* (2006.01)
*H04J 4/00* (2006.01)

(52) U.S. Cl. .................. 370/404; 370/410; 370/438

(58) Field of Classification Search ......... 370/223–258, 370/403–466; 398/5, 158, 59, 75–79; 709/234–251, 709/202–230
See application file for complete search history.

(56) References Cited

U.S. PATENT DOCUMENTS

| | | | | |
|---|---|---|---|---|
| 4,757,497 A | * | 7/1988 | Beierle et al. | 370/405 |
| 4,768,190 A | * | 8/1988 | Giancarlo | 370/400 |
| 4,817,088 A | * | 3/1989 | Adams | 370/402 |
| 4,914,652 A | * | 4/1990 | Nguyen | 370/452 |
| 4,933,935 A | * | 6/1990 | Adams | 370/406 |
| 5,008,663 A | * | 4/1991 | Adams | 340/825.5 |
| 5,228,034 A | * | 7/1993 | Urien | 370/456 |
| 5,247,518 A | * | 9/1993 | Takiyasu et al. | 370/466 |
| 5,418,785 A | * | 5/1995 | Olshansky et al. | 370/438 |
| 5,477,536 A | * | 12/1995 | Picard | 370/400 |
| 5,500,857 A | * | 3/1996 | Nakata | 370/440 |
| 5,566,178 A | * | 10/1996 | Butter et al. | 370/452 |
| 5,621,383 A | * | 4/1997 | Yoshiyama | 340/506 |
| 5,631,906 A | | 5/1997 | Liu | |
| 5,643,006 A | * | 7/1997 | Wang et al. | 439/419 |

(Continued)

FOREIGN PATENT DOCUMENTS

EP 0 599 177 A1 6/1994

(Continued)

OTHER PUBLICATIONS

Marsan, M., Bianco, A., Leonardi, A., Morabito, F. and Neri F., "SR3: a Bandwidth-Reservation MAC Protocol for Multimedia Applications over All-Optical WDM Multi-Rings", May 1997 IEEE (Publication No. 0-8186-7780-5/97).

(Continued)

*Primary Examiner*—Man Phan
(74) *Attorney, Agent, or Firm*—Garlick Harrison & Markison; Jessica W. Smith

(57) ABSTRACT

A metropolitan access network (10) uses a variation of a MAC protocol, where each station (14) on a ring (12) is associated with one or more time slot (30). Each slot carries information regarding the associated station, basic connection fields (32), communications fields (34), and quality of service fields (36). Each station maintains its own local database regarding the status of the network (10) by reading the information in each time slot (30).

17 Claims, 3 Drawing Sheets

U.S. PATENT DOCUMENTS

| | | | | |
|---|---|---|---|---|
| 5,764,392 | A * | 6/1998 | Van As et al. | 398/79 |
| 5,815,490 | A * | 9/1998 | Lu | 370/223 |
| 5,886,992 | A | 3/1999 | Raatikainen et al. | |
| 5,960,000 | A | 9/1999 | Ruszczyk et al. | |
| 6,141,325 | A * | 10/2000 | Gerstel | 370/238 |
| 6,256,317 | B1 * | 7/2001 | Holloway et al. | 370/447 |
| 6,584,089 | B1 * | 6/2003 | Honkasalo et al. | 370/338 |
| 6,728,484 | B1 * | 4/2004 | Ghani | 398/42 |
| 6,785,277 | B1 * | 8/2004 | Sundling et al. | 370/392 |
| 6,922,390 | B1 * | 7/2005 | Chapman et al. | 370/229 |
| 6,925,259 | B2 * | 8/2005 | Boroditsky et al. | 398/75 |
| 7,174,374 | B2 * | 2/2007 | Wang et al. | 709/223 |
| 7,180,860 | B2 * | 2/2007 | Fonden et al. | 370/235 |
| 7,277,948 | B2 * | 10/2007 | Igarashi et al. | 709/227 |

FOREIGN PATENT DOCUMENTS

| | | |
|---|---|---|
| JP | 56020351 A | 2/1981 |
| JP | 62-081844 | 4/1987 |
| JP | 11098167 A | 4/1999 |
| JP | 11261514 A | 9/1999 |

OTHER PUBLICATIONS

Singh, G., "Reservation Based MAC Protocol for a Wireless ATM LAN",[online] [retrieved on Jan. 14, 2001]. Retrieved form the Internet: <URL:http://www.isr.umd.edu/TechReports/ISR/1997/MS_97-3/MS_97-3.phtml>.

Ma, et al.; An Efficient Message Scheduling Algorithm for WDM Lighwave Networks; Computer Networks; Sep. 27, 1999; pp. 2139-2152; vol. 31, Iss. 20; Elsevier Science Publishers; Amsterdam NL.

Li, Bo; Bandwidth Management for High Speed LANs Using Wavelength Division Multiplexing; Computer Communications; Aug. 1995; pp. 572-581; vol. 18, Iss. 8; Elsevier Science Publishers; Amsterdam NL.

Chen, et al.; A Media-Access Protocol for Packet-Switched Wavelength Division Multiaccess Metropolitan Area Networks; IEEE Journal on Selected Areas in Communications; Aug. 1990; pp. 1048-1057.

Koonen, et al.; Dynamically Reconfigurable WDM Hybrid Fibre Access Network for IP-Based Services with Various QoS Demands; Proc. European Conference on Networks and Optical Communications 2000; Jun. 6-8, 2000; pp. 134-140; Amsterdam NL.

Marsan, et al.; SR3: A Bandwidth-Reservation MAC Protocol for Multimedia Applications Over All-Optical WDM Multi-Rings; INFOCOM '97; 16th Annual Joint Conference of the IEEE Computer and Communications Societies; Apr. 7-11, 1997; pp. 761-768; vol. 2.

Singh, G.; Reservation Based MAC Protocol for a Wireless ATM LAN: Master's Thesis; Center for Satellite and Hybrid Communication Networks; 1997; pp. i-ix, 1-96, cover pages.

Medeiros, et al.; Design and Performance Analysis of a Media Access Control Protocol for a Wavelength Division Multiplexing Circuit-Switched Network; London Communications Symposium; Jul. 26, 1999; pp. 1-4.

* cited by examiner

| NODE | TIME | STATUS | OPERATION | FROM NODE/ TO NODE | WAVELENGTH | TYPE OF SERVICE | PROTECTION | MULTICASTING | IDLE COUNTER | RATE |
|---|---|---|---|---|---|---|---|---|---|---|
| A | | ACTIVE | TRANSMIT | C | 1 | BEST EFFORT | UNPROTECTED | NO | | 2.5 Gb |
| B | | IDLE | | | | | | | | |
| C | | ACTIVE | RECEIVE | A | 1 | BEST EFFORT | UNPROTECTED | NO | | 2.5 Gb |
| D | | ACTIVE | RECEIVE | F | 3 | VOICE | PROTECTED ON 4 | NO | | 1.25 Gb |

DISTRIBUTED INTELLIGENCE MAC PROTOCOLS FOR DWDM RING NETWORKS

CROSS-REFERENCE TO RELATED APPLICATIONS

This application claims the benefit of the filing date of copending provisional application U.S. Ser. No. 60/264,113, filed Jan. 25, 2001, entitled "Distributed Intelligence MAC Protocols for DWDM Ring Networks" to Tancevski.

STATEMENT OF FEDERALLY SPONSORED RESEARCH OR DEVELOPMENT

Not Applicable

BACKGROUND OF THE INVENTION

1. Technical Field

This invention relates in general to networks and, more particularly, to metropolitan networks.

2. Description of the Related Art

FIG. 1 illustrates a basic block diagram of a metropolitan access network 10 using a DWDM (Dense Wavelength Division Multiplexing) ring 12 and a MAC (medium access control) protocol. A plurality of stations 14 are coupled to the DWDM ring 12. The stations 14 may be coupled to other networks, such as local area networks and wide area networks, as well. In the illustrated embodiment, Station1 and Station2 are coupled to LANs (local area networks) 16, and Station3 is coupled to a WAN (wide area network) 18. Station4 is a stand-alone computer. Various station types may be coupled to the ring, such as stand-alone computers, servers, packet ADMs (Add/Drop Multiplexer), bridges, gateways, IP routers and optical cross-connects.

In operation, metropolitan access networks (also referred to as MANs) are used to connect stations in an area spanning up to 100 kilometers. Voice, video, and data may be carried over the MAN 10. Typically, less than several hundred stations 14 are coupled to the ring 12 in a metropolitan access network 10. In the arrangement shown, information is communicated on ring 12 over multiple channels 20, each channel 20 having an associated unique wavelength ($\lambda$), as shown in FIG. 2. One of the channels 20 is designated as the control channel 22. The remaining n channels are data channels 24 which can carry either voice or data information.

Communications between stations 14 is provided through reservations of the channels by a station 14 that wishes to initiate a communication with one or more other stations 14. For example, Station1 could communicate to Station2 by reserving the $\lambda_3$ data channel. Once reserved, only Station1 and Station2 could use this channel; the other stations 14 would be blocked out from using $\lambda_3$, but could use any other available channel. Station1 could also multicast data to multiple stations 14 using a single data channel 24. Further, a single station 14 could communicate independently with multiple stations over separate channels. For example, Station1 could be communicating with Station2 over channel $\lambda_1$ and could be communicating with Station3 over channel $\lambda_2$ at the same time, if such an interface is implemented at the stations.

To allocate the data channels 24 between the various stations 14, the control channel 22 continuously circulates tokens 26 between all the stations 14 on the ring 12, as shown in FIG. 3. Each token 26 has a one-to-one relationship with a data channel 24; hence there are n tokens 26 used to represent the n data channels 24. When a first station 14 needs to communicate with a second station 14 on the ring 12, it monitors the tokens 26 passed over the control channel 22. Each token will have a field indicating the availability of the channel. When the first station 14 receives a token indicating its availability, the first station modifies the token 26 to indicate the desired communication (in this case, a point-to-point communication to the second station) and changes the token to indicate that the associated data channel 24 is currently occupied. When the modified token 26 is received by the second station 14, an acknowledgement is sent to the first station 14 and the selected channel 24 is set up for the communication between the two stations 14. When the communication is finished, the first station 14 releases the communication channel 24 by modifying its token 26 to indicate the availability of the channel 24.

Since each token 26 is shared among all the stations 14 in the network 10 and signifies only availability of transmission slot, it is completely insensitive to the types of services and does not provide for any bandwidth fairness issue. For instance, a station 14 requesting service for a best effort type application would receive the same treatment as a station 14 requesting service for a time-sensitive application. Furthermore, the tokens 26 do not provide for an associated expiration of service, so a greedy application can consume substantial portion of the bandwidth. Finally, the round-trip time of a token, stemming from the fact that a station has to wait up to a full round-trip to sense an empty token 26, can pose significant delays, especially as the network diameter increases. Accordingly, the strains on the electronic buffers of the stations 14 can become pronounced.

Therefore, a need has arisen for a more efficient metropolitan access network and associated protocol that accounts for quality of service issues.

BRIEF SUMMARY OF THE INVENTION

In the present invention, a network comprises a network ring for providing communication on a plurality of channels, wherein at least one of the channels passes control information, and multiple devices operable to communicate with one another over a selected channel on the network ring. Each device includes circuitry for generating control information related to its current communication status and transmits the status information on the ring. Further, the devices read control information of other devices from the ring and maintain a local database of the current communications status of the devices based on the control information.

The present invention provides significant advantages over the prior art. Connections between devices on the network can be set up and broken down faster. Further, the control information can include information related to quality of service.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The present invention is best understood in relation to FIGS. 4-7 of the drawings, like numerals being used for like elements of the various drawings.

Figure 1:
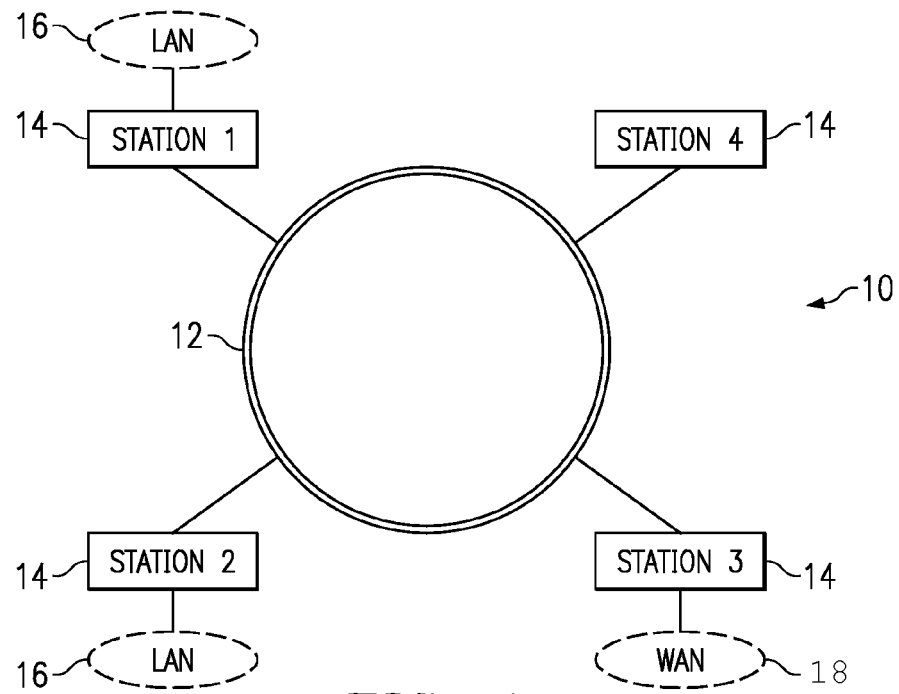
FIG. 1 illustrates general block diagram of a metropolitan access network.
Figure 2:
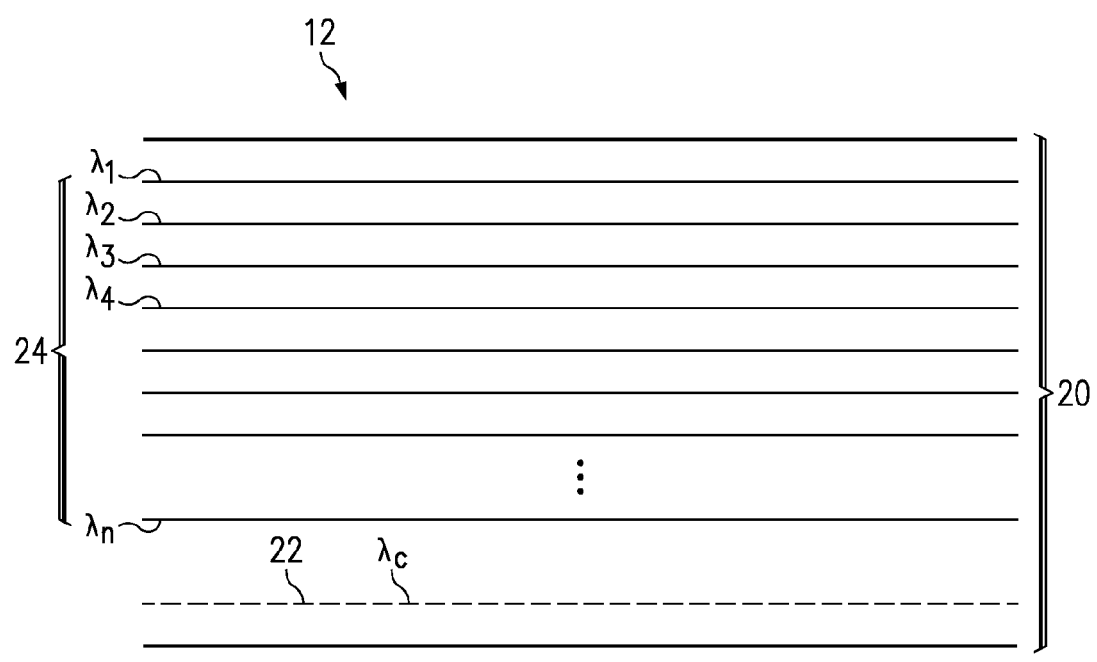
FIG. 2 illustrates the division of a carrier into multiple channels of different wavelengths.
Figure 3:
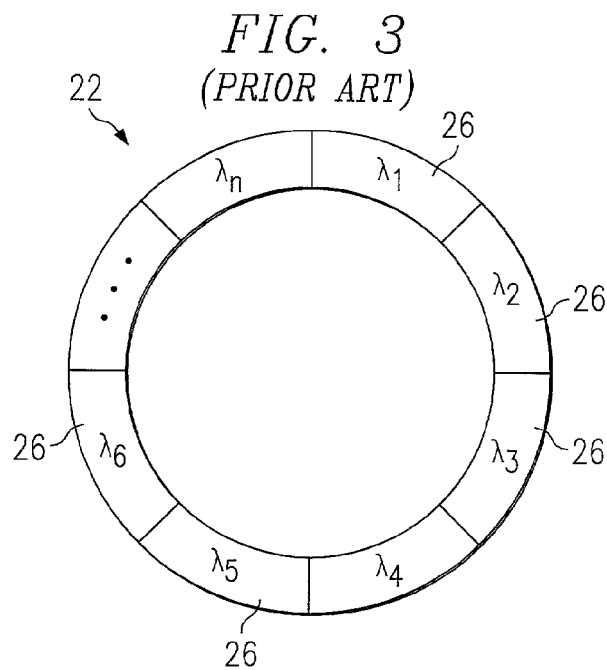
FIG. 3 illustrates a prior art protocol for providing communications between stations coupled to a carrier.
Figure 4:
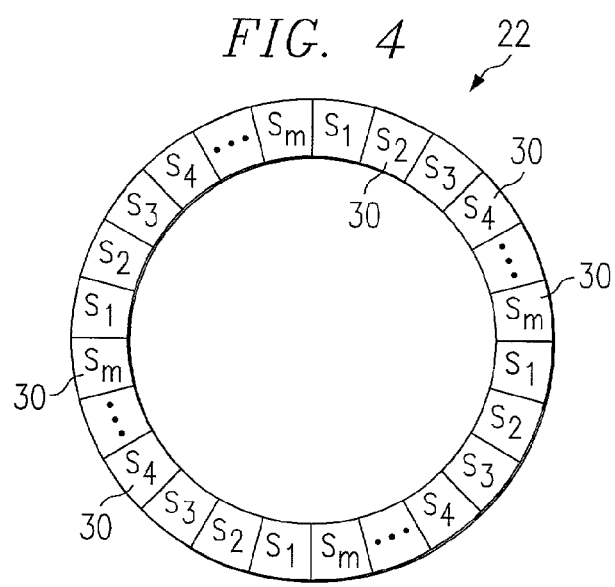
FIG. 4 illustrates a protocol for providing communications between stations coupled to a carrier with quality of service provisions.

A variation on the network shown generally in FIGS. 1 and 2 is described hereinbelow. FIG. 4 illustrates a different protocol used on control channel 22, wherein the control channel is divided into multiple slots 30, where each slot 30 represents an associated station 14 on the ring 12. Each slot 30 includes status information regarding the communication channels in use by the associated station 14, along with other status information, such as quality of service information. Each of the m stations on ring 12 may have multiple associated slots 30 circulating on the ring 22. For example, in FIG. 3, each station 14 is represented by four slots 30. The number of slots 30 allocated to each station will depend upon the desired length of each slot 30 and the number of stations 14 on the ring 22.

Each slot 30 includes an identification of the associated station 14 (the "resident" station). Only the resident station may modify the information of one of its associated slots 30 although the other stations (the "non-resident stations") can monitor another station's slots 30 for information.

As in the prior art, the network may use a separate control channel 22 on a distinct wavelength to pass the slots 30 between the stations 14. Alternatively, the control channel could be placed on a subcarrier. While the separate wavelength solution offers simplified detection, it also consumes a portion of the bandwidth. In one embodiment, the control channel 22 is time slotted and perfectly synchronized. Each of the time slots 30 is dedicated to one station 14 in the network and carries information relevant to the status of that station. Therefore, the entire perimeter of the ring is divided into time slots 30, as indicated in FIG. 4. In theory, it is enough that there is one time slot per station, which limits the number of time slots since it is likely that the number of stations will not exceed several hundred. Hence for a ring with perimeter of 100 km and supporting one hundred stations, the duration of each time slot will be roughly 5 μs (assuming one slot 26 per station 14). At bit rate 10 Gb/s, each time slot can carry roughly 5000 bytes of information.

In the vast majority of applications, a much smaller slot size is sufficient to carry all desirable information, discussed in greater detail below. By dividing the perimeter into more time-slots and allocating more than one slot 26 to each station, as shown in FIG. 4, the round trip time (the time between slots associated with the same station) can be significantly reduced. In the previous example, with one slot per station in a 100 km ring, the round trip time is 0.5 ms. If the perimeter is subdivided into ten time-slots per station, each time-slot can carry 500 bytes of information, which should be enough in most cases, but the round-trip delay is ten times smaller and is only 0.05 ms or 50 μs. Naturally, the trade-off between slot size and round-trip time can be adjusted as necessary for a given application.

Figure 5:
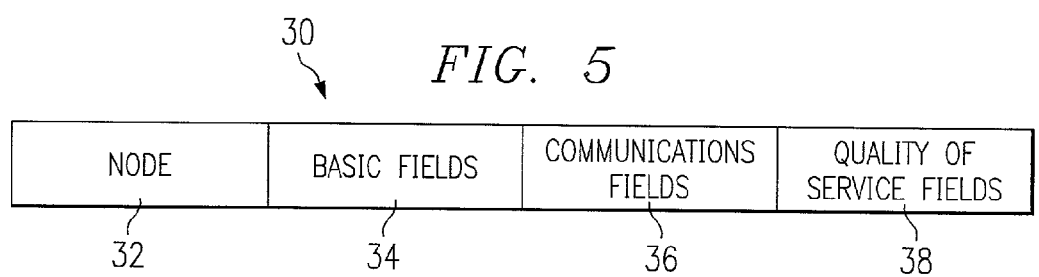
FIG. 5 illustrates an allocation of fields within each slot of the protocol of FIG. 4.

FIG. 5 illustrates the contents of each slot 30 in greater detail. In the preferred embodiment, each slot contains a node field 32, basic fields 34, communications fields 36 and quality of service (QoS) fields 38. The node field 32 indicates the resident station. The basic fields 34 indicate the status of the resident station, i.e., is the station presently communicating and, if so, the nonresident station(s) in communication with the resident station and an identifier of the data channel being used for the communication. The communication fields 36 can contain, for example, information regarding negotiations for data channels, including ACKs and NACKs, as well as reports about internal status, available wavelengths. This field can also be used where communications with a station may occur with only a subset of the available data channels 24, which is likely to occur when the number of discernable wavelengths (and hence channels) increase using DWDM and some or all of the stations have limited tunability. The quality of service fields 38 include information regarding the type of communication, such as whether the communication is time-sensitive or best effort. The field list described above is not meant to be exhaustive.

In operation, the resident stations 14 update information in the slots regularly. Non-resident stations 14 observe the slots 30 and use the information from the slots 30 to build local tables where information about the status of each node is stored and constantly updated. Thus, for each station, the table has current information about the entire network. In the illustrated embodiment, only basic and QoS fields 34 and 38 are used to create the local status tables, whereas the communication field 36 is used exclusively for the purposes of communication between the involved nodes.

Figure 6:
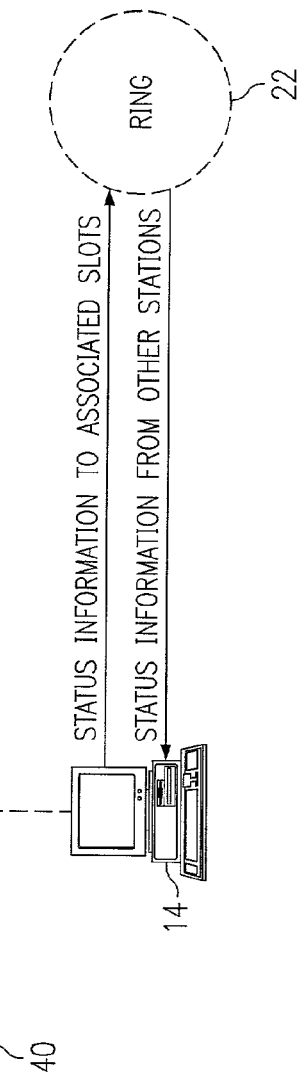
FIG. 6 illustrates an example of a local table derived from information in the fields of FIG. 5.

An example of the local table 40 stored in the nodes is depicted in FIG. 6, with four stations denoted as A, B, C and D. It should be emphasized that local tables are built solely based on the information contained in the individual timeslots 30. In the example of FIG. 6, the basic fields 34 are used to maintain the "time", "status", "operation", "from/to" and "wavelength" (or channel) columns. The "node" column indicates the resident station (IP addresses could be used). The status column indicates whether the resident station is active or idle. The operation column indicates whether the resident station is transmitting or receiving. The from/to column indicates the station that the resident station is communicating with, if any (again IP addresses could be used). The wavelength column indicates the data channel 24 on which the communication is taking place. The columns described above are basically responsible for providing state information for the associated station 14. The time column indicates the time at which the information in each time-slot 30 has been updated by its resident node. This field may be used to detect failures by exposing situations where time field has not been updated for an extended period of time, especially if non-contiguous frame format is to be implemented.

Reading from the table 40 of FIG. 6, node A is transmitting to node C on λ=1, whereas node D is receiving from node F on λ=3. The time information is not depicted on this example, but it should be expressed in terms of time local to the resident node. Since synchronization takes place on the control channel 22, this does not represent a global problem.

The remaining columns indicate QoS sensitive information on the various communications between stations 14, added to facilitate QoS based differentiation. The "type of service" column indicates the type of service, if any, engaged in by the resident station, i.e., whether there is best effort traffic involved or the traffic is time-sensitive. This is closely related with the communication field 36 where bandwidth negotiation could take place, but is also related to the "idle counter" column of table 40 where there might be a counter to prevent greedy applications for monopolizing the resources—if a connection is idle for a period of time, it might be deemed terminated. This would provide a mechanism for securing bandwidth fairness. Further, there is a "multicasting" field indicating the nature of the traffic, whether it is a uni-casting or multicasting traffic. In case of multicasting traffic, the information contained in this column could include the multicasting tree. A "protection" column indicates whether the communication is protected or unprotected and at which channel it is protected. This opens up the way for QoS based differentiation in the protection mechanism and it could be a useful addition as best effort traffic could be carried over the protection path while the protection is not needed, and will be rerouted in case the protection channel kicks off. Indication on this can be obtained readily from the local status table since failures are also visible in the table through the update time column. The idle counter field is used to specify for how long the connection has been inactive and in case of best effort traffic, if it has been inactive for a prolonged period of time, it can be terminated and taken over by higher priority traffic connection. A rate column indicates the requested bandwidth for each connection in the network.

FIG. 4 illustrates an "out-of-band" embodiment where a control channel 22 on a separate frequency (or fiber) from the data channels 24 is used by the stations 14 solely for control information.

Figure 7:
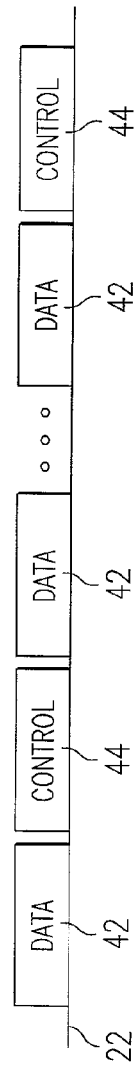
FIG. 7 illustrates an alternative in-band configuration where data and control are communicated on a common channel.

FIG. 7 illustrates an alternative, "in-band" embodiment, where a channel 20 can be used for both data and control information, thereby providing adding additional communication capability to the network. In this embodiment, a single frequency carries both control packets 44 and data packets 46. Control packets are sent periodically by the stations 14, instead of using timeslots 30. The information in the control packets 44 can be identical to that described above.

The in-band embodiment could use one of the channels 20 to pass both control and data packets.

While the invention has been described in connection with a token-ring architecture, it can anywhere that a MAC protocol is used to improve the efficiency of the network.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

The invention claimed is:

1. A method for communicating from a station to a plurality of other stations over a ring network, comprising:
   communicating data and control packets by the station on a channel, wherein the station periodically transmits the control packets on the channel to provide its status information to the other stations on the ring network and wherein the status information in the control packets comprises node identification to identify the station originating the control packet and rate information of current communications being transmitted to the other stations;
   maintaining a local database of status of other stations on the ring network, wherein the local database is updated from the control packets received from the other stations on the ring network and includes rate information of current communications of the other stations; and
   using a communication field in the control packet for bandwidth negotiation to secure bandwidth fairness based on the information in the local database.

2. The method of claim 1, wherein each of the plurality of other stations maintain a local database of status of other stations on the ring network received in control packets.

3. The method of claim 2 wherein each of the local databases include a node identifier for each station on the ring network.

4. The method of claim 2 wherein each of the local databases include rate information and corresponding channel identifier for communications by the stations.

5. The method of claim 2 wherein each of the local databases include quality of service information for communications by the stations.

6. The method of claim 5 wherein the quality of service information includes information indicating type of communication.

7. The method of claim 5 wherein the type of communication includes best effort communication and time sensitive communication.

8. The method of claim 1 wherein the rate information of communications of the other stations includes reserved bandwidth for channels in the ring network.

9. A method of communicating in a device to other devices on a ring network, comprising the step of:
   periodically transmitting control packets by the device on a channel in the ring network, wherein the control packets include quality of service and rate information of current communications of the device being transmitted to the other devices on the ring network;
   reading control packets transmitted by the other devices on the ring network and maintaining a local database of the quality of service and rate information of current communications of the other devices on the ring network; and
   negotiating bandwidth to secure bandwidth fairness based on the quality of service and rate information of current communications of the other devices.

10. The method of claim 9 wherein a same channel in the ring network is used to transmit both control and data packets.

11. The method of claim 9 wherein the quality of service information includes status of a communication and type of service of a communication.

12. The method of claim 11 further including the step of terminating a communication if it has been inactive for a prolonged period of time.

13. The method of claim 11 wherein the quality of service information includes rate information for communications of the devices.

14. The method of claim 9 wherein the quality of service information includes type of service of communications for the device.

15. The method of claim 14 wherein the type of service of communications for the device includes best effort type of service.

16. The method of claim 9 wherein each device uses Medium Access Control (MAC) protocol.

17. The method of claim 9 wherein the control packets further include a node identifier to identify the device originating the control packet.

* * * * *